(12) United States Patent
Witty (10) Patent No.: US 7,562,516 B2
(45) Date of Patent: *Jul. 21, 2009

(54) MOWING APPARATUS

(75) Inventor: Craig Witty, Winnetka, IL (US)

(73) Assignee: O-Sage, LLC, Winnetka, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/139,500

(22) Filed: Jun. 15, 2008

(65) Prior Publication Data

US 2008/0245046 A1 Oct. 9, 2008

Related U.S. Application Data

(63) Continuation-in-part of application No. 10/996,959, filed on Nov. 24, 2004, now Pat. No. 7,386,974.

(60) Provisional application No. 61/021,027, filed on Jan. 14, 2008.

(51) Int. Cl.
*A01D 34/53* (2006.01)
(52) U.S. Cl. .......................................... 56/249; 56/294
(58) Field of Classification Search .................. 56/249, 56/249.5, 250–254, 294
See application file for complete search history.

(56) References Cited

U.S. PATENT DOCUMENTS

| | | |
|---|---|---|
| 0,468,075 A | 2/1892 | Wood |
| 1,644,889 A | 10/1927 | O'Byrne et al. |
| 1,823,219 A | 9/1931 | Vimtrup |
| 1,837,725 A | 12/1931 | Newton et al. |
| 1,992,119 A | 2/1935 | Campion |
| 2,016,987 A | 10/1935 | Cheadle |
| 2,183,544 A | 12/1939 | Clemson |
| 2,309,635 A | 2/1943 | Edwards |
| 2,449,042 A | 9/1948 | Abbrecht |
| 2,517,184 A | 8/1950 | Elliott et al. |
| 2,535,185 A | 12/1950 | Adamczyk |
| 2,599,883 A | 6/1952 | Aske |
| 2,665,539 A | 1/1954 | Cawood |
| 2,685,774 A | 8/1954 | Williams |
| 2,759,321 A | 8/1956 | Force |
| 2,777,274 A | 1/1957 | Beaumont |
| 2,790,293 A | 4/1957 | Crotty |
| 2,929,190 A | 3/1960 | Woody |

(Continued)

OTHER PUBLICATIONS www.lawnmowerworld.co.uk, Allen Scythe 1930.

*Primary Examiner*—Alicia M Torres
(74) *Attorney, Agent, or Firm*—Clause Eight; Michael Catania (57) ABSTRACT

A mowing apparatus includes a reel mechanism and a cutting mechanism. The reel mechanism rotates about a first central axis in a first direction. The cutting mechanism rotates about a second central axis in a second direction opposite of the rotation of the first direction. The cutting mechanism is positioned eccentric to the reel mechanism wherein the first central axis is offset from the second central axis by a distance less than 10% of the diameter of a reel diameter. The reel mechanism and the cutting mechanism are configured to have at least one cutting blade contact at least one reel bar during the rotation of the cutting mechanism about the second central axis such that vegetation is cut at a section of a rotary path of the reel mechanism that is greater than 10% of a circumference of the rotary path.

14 Claims, 6 Drawing Sheets

U.S. PATENT DOCUMENTS

| | | |
|---|---|---|
| 3,068,632 A | 12/1962 | Postlewait et al. |
| 3,863,429 A | 2/1975 | Beusink et al. |
| 3,964,243 A | 6/1976 | Knipe |
| 3,979,887 A | 9/1976 | Stewart |
| 4,345,419 A | 8/1982 | Chandler |
| 4,532,708 A | 8/1985 | Mensing |
| 4,563,867 A | 1/1986 | Bokon |
| 4,916,887 A | 4/1990 | Mullet et al. |
| 5,019,113 A | 5/1991 | Burnell |
| 5,400,576 A | 3/1995 | Smith |
| 5,867,973 A | 2/1999 | Geier |
| 6,321,518 B1 | 11/2001 | O'Hagan |
| 6,543,210 B2 | 4/2003 | Rostoucher et al. |
| 6,618,925 B2 | 9/2003 | Rickheim |

MOWING APPARATUS

CROSS REFERENCES TO RELATED APPLICATION

The Present Application claims priority to U.S. Provisional Patent Application No. 61/021,027, filed on Jan. 14, 2008, and is a continuation-in-part application of U.S. patent application Ser. No. 10/996,959, filed on Nov. 24, 2004, now U.S. Pat. No. 7,386,974.

STATEMENT REGARDING FEDERALLY SPONSORED RESEARCH OR DEVELOPMENT

Not Applicable

BACKGROUND OF THE INVENTION

1. Field of the Invention

The present invention relates to mowing apparatuses. More specifically, the present invention relates to an apparatus for mowing lawn grass.

2. Description of the Related Art

Lawn mowers are well known devices used for cutting grass and commingled weed plants in order to maintain the appearance of an outdoor area such as a residential lawn or golf course. There are many types of lawn mowers, including rotary mowers and reel mowers. Additionally, many different cutting blades or cutter heads are known for use with lawn mowers and other plant cutting devices.

The gasoline-powered rotary mower is by far the dominant grass cutting mechanism on the market today. Less commonly, rotary mowers are powered by mains- or battery-operated electric motors. In the most familiar rotary configuration, a heavy steel blade with sharpened edges at opposing distal ends is spun at high speed around a central pivot point inside a cylindrical, open-bottomed chamber that is moved across the lawn. The blade is commonly shaped to create a zone of low air pressure above the grass in order to lift the individual shafts into the plane of the spinning blade. The power mower housing functions to prevent injury to the operator and to control the direction of discharge of the clippings generated during operation.

Different rotary cutting blade configurations are used for a variety of reasons. Burnell, in U.S. Pat. No. 5,019,113, discloses a rotary lawn mower assembly having easily detachable replacement blades. Mensing, in U.S. Pat. No. 4,532,708, discloses a blade assembly with a plurality of cutting segments arranged end to end for improved cutting. Knipe, in U.S. Pat. No. 3,964,243, shows a rotary cutting blade with detachable tines used to blow grass clippings from the mower's path.

Mullet, et al, in U.S. Pat. No. 4,916,887 discloses a rotary mulching mower using a multiplicity of cutting blades within the mower housing. Each cutting blade rotates through a different plane to cut the grass clippings into mulch. Geier, in U.S. Pat. No. 5,867,973, shows a single rotary blade consisting of multiple adjustable cutting edges to accomplish the mulching function.

Irrespective of the fact that rotary power mowers are ubiquitous, they have several significant drawbacks. The primary drawback associated with the rotary power mower is that a free-spinning steel blade is a relatively inefficient grass cutting instrument. Since a shaft of grass has little mass and can be easily deflected, the mower blade must be spun at very high power levels in order to adequately perform the cutting function. It is not uncommon to find standard rotary mower engines rated at six horsepower and above. As a consequence, in a gasoline-powered rotary mower the engine is large, noisy, creates significant air pollution, and uses relatively large amounts of energy per blade of grass cut. It was estimated in 2003 by William A. Burke, Chairman of the California South Coast Air Quality Management District, that an older gas-powered lawn mower pollutes as much in one year of typical use as a new car driven more than 86,000 miles.

Electric rotary mowers generate lower levels of noise and no (local) air pollution, but suffer from the same inherent cutting inefficiencies. As a result, they tend to be heavy and expensive due to the large battery capacity needed to generate the required inertial cutting forces.

Regardless of the power source, because the blade of the rotary mower is essentially a sharpened, if not always sharp, flail, the cut edge at the top of the living shaft of grass is often torn or ragged. A ragged grass cut is undesirable, both in terms of the appearance of the lawn and for the health of the grass. In sandy or debris-strewn soil, blades spinning at high speed erode quickly and require frequent sharpening or replacement.

Another disadvantage presented by a conventional rotary mower is the inherent danger of unintended contact with the high-speed blade. The blade is a direct threat if the user comes in contact with it, and an indirect threat if it propels an object from the housing. Grievous injuries have been sustained by both experienced and inexperienced users of rotary power mowers due to both of these conditions.

Tall grass presents another problem for conventional rotary mowers. The tendency is for tall grass to be flattened as the mower housing passes over. If the grass is very long, the housing will hold it to the ground so that it is not effectively cut.

It is believed that no current rotary lawn mowing device sufficiently addresses these problems.

Another common, and historically very significant, grass cutting mechanism is the reel mower. This device is typically constructed with a set of four to ten heavy steel blades fixed in a cylindrical form and rotated about the axis of the cylinder parallel to the ground and perpendicular to the direction of travel of the mower. The blades are generally twisted in a helical form, and positioned to graze the leading edge of a horizontal bed knife suspended at the desired cutting distance above the ground. As the mower is pushed forward, the blades of grass are swept against the bed knife and sheared between the knife and the passing helical blade. In the past, such reel mowers have been powered by both gasoline and electric motors, but the most common configuration, historically and at the present, is the human-powered "push mower".

Compared to rotary mowers, revolving blade reel mowers have a great advantage in terms of cutting efficiency. The bed knife and revolving helical blades interact to create a 'scissors' action that is not only energy efficient as a cutting mechanism, but which also creates a clean cut at the top of the living shaft of grass. Lawns that are routinely cut with reel mowers, such as is commonly the practice at many golf courses. Such courses have a groomed appearance that is generally considered superior to lawns cut with rotary mowers. There is also a consequent improving effect on the health of the grass.

There have been numerous variations in the design of the basic reel mower. Many deal with the need to accurately preserve the gap between the bed knife and the revolving blades in order to maintain efficient cutting action. Rickheim, in U.S. Pat. No. 6,618,925, discloses a method of constructing a bed knife assembly that restricts the movement of the bed knife blade relative to a clamp plate. Bokon, in U.S. Pat. No.

4,563,867, shows a rotary cutter that consists of concentric circular cutting discs rather than a reel-type bale. Chandler, in U.S. Pat. No. 4,345,419, discloses a self adjusting, floating reel blade mower, as does Beusink et al. in U.S. Pat. No. 3,863,429. Crotty, in U.S. Pat. No. 2,790,293, discloses a cutting mechanism consisting of rotating flanged discs in cooperation with a toothed stationary cutter bar.

Compared to the single freely rotating solid steel blade of the rotary mower, the cutting device of the reel mower is complex and expensive to produce. It is not uncommon for a powered reel mower of the sort used by golf courses to cost several thousand dollars. The need to preserve a precise gap between the reel and the bed knife is a disadvantage of the reel type mower relative to the rotary mower, since it generally requires that the mechanism be constructed of heavy-gauge, rigid materials that are capable of maintaining proper alignment throughout long-term use.

Designs have been disclosed for revolving blade cutters without an associated bed knife. Postlewait et al. in U.S. Pat. No. 3,068,632 shows a design that consists of two long thin blades affixed to the sides of a spinning horizontal roller. Another design, disclosed by Newton et al. in U.S. Pat. No. 1,837,725, shows two resilient metal blades connected to an axle, and "revolved by the rotation thereof to cut grass, the cutting being accomplished entirely by the revolving blades." The drawback inherent in both of these 'bed knife-free' designs is the same as found in the rotary mower; namely, the relative inefficiency of cutting low mass materials such as shafts of grass with purely inertial forces.

Abbrecht, in U.S. Pat. No. 2,449,042, discloses a mechanism that substitutes elongated brushes for the helical blades in the reel. The brushes provide a compliant means of sweeping the grass against the bed knife, and Abbrecht claimed more efficient, as well as quieter operation for this mechanism relative to a steel-bladed reel. The results of any attempts to reduce this design to practice are unknown.

In addition to complexity and cost, reel-type mower mechanisms suffer from another important disadvantage compared to rotary power mowers. The reel/bed knife mechanism is incapable, by itself, of mulching grass. The bed knife is set at a fixed distance to the ground and the reel sweeps each blade of grass against the bed knife only once as the mower passes. Unless a lawn is cut very frequently, any mowing system that does not mulch the cut grass generally requires that the clippings be removed for aesthetic reasons. This creates an additional task for the operator (either raking the lawn or emptying a clippings catcher), and more importantly for the health of the grass, deprives the lawn of valuable nutrients. It also creates a burden for the local municipality if the clippings are hauled away to a landfill. The practice of disposing of grass clippings, rather than mulching them, is therefore counterproductive in a compound way.

Various means have been devised for reel mowers to redirect cut pieces of grass back into the zone of the bed knife in order to be re-cut. Smith, in U.S. Pat. No. 5,400,576, discloses a mulching device for powered reel-type lawn mowers. Aske, in U.S. Pat. No. 2,599,883, discloses a clipping guide for push mowers that is meant to accomplish this task, as do Williams in U.S. Pat. No. 2,685,775, and Elliott and Johnston in U.S. Pat. No. 2,517,184. All four of these disclosures describe a cover or cowling of some sort that is intended to passively channel clippings back to the cutting zone. Perhaps because the mechanisms are passive, there is a tendency for them to become clogged, and for the re-cutting process to be haphazard.

Force, in U.S. Pat. No. 2,759,321, discloses a combined mower and mulch machine with multiple swinging blades arranged along a horizontal shaft in a manner that is superficially similar to a reel mower. The grass is cut purely by inertial forces, however, and this design suffers the same disadvantages as a powered rotary mower.

No current lawn cutting device based on the design of a reel mower is known to exist that sufficiently addresses the problem of the complexity and cost required to maintain an accurate gap between the reel and the bed knife, nor does any known design embody an intrinsic and efficient mulching function.

A few other basic cutting mechanisms have been applied to lawn mowing. One of the more successful designs entails the use of a reciprocating toothed blade in cooperation with a fixed toothed bar, in a manner similar to a hedge trimmer. Wood, in U.S. Pat. No. 468,075, discloses such a device designed to be manually operated. The Allen Scythe, produced in England from the 1930s, used a similar mechanism powered by a gasoline engine. Updated versions of the basic design are available in various models of the AL-KO Scythe Bar Mower, but their popularity seems to be largely limited to the UK, Australia, and New Zealand. This may be because the machines tend to create significant vibrations and are considered somewhat unwieldy. The exposed cutting zone at the front of the machine also represents a safety concern. These designs are also devoid of an effective mulching function.

Implements with rotating or revolving blades have been designed and used for cutting forms of vegetation much larger than grass. Rostoucher et al., in U.S. Pat. No. 6,543,210 discloses a cutting mechanism consisting of a rotor equipped with knives in recessed pockets that can be hitched to a tractor. O'Hagan, in U.S. Pat. No. 6,321,518, discloses a tubular rotor containing a plurality of swinging blades. Flail mechanisms such as these can be very effective in clearing ground of shrubs and small trees, but tend to be overkill when the task consists of removing undergrowth, rank grasses, and weeds.

Campion, in U.S. Pat. No. 1,992,119, discloses a cutting device for a lawn mower that is comprised of a pair of counter-revolving cutters that interact so that the cutting action takes place regardless of whether the mower is moved forwards or rearwards. The axes of the paired cutters, which take the form of close-tolerance nested reels, are eccentric, and the revolving cutters are active "only at the cutting plane and effective for a shearing action." As a consequence, this is not a design that embodies a mulching function.

In U.S. Pat. No. 2,777,274, Beaumont describes a mower mechanism in which a shearing bar is positioned inside a revolving cutter drum. The shearing bar is mounted "in a substantially fixed position and does not rotate with the drum" and is "mated to the inner surface of the cylindrical drum and held substantially at the height to which the vegetation is to be trimmed so that rotation of the drum forces the grass or other vegetation against the shearing bar, whereby it is trimmed off." Because the shear bar in Beaumont's design is mounted in a fixed position at the cutting height, the device is incapable of providing a mulching function.

Edwards, in U.S. Pat. No. 2,309,635, discloses a hybrid grass-cutting, hedge-trimming device which consists of concentric nested counter-rotating helical cutters which in theory is capable of performing a mulching function. In order to perform this function, however, the relative positions of the rigid cutting elements must be maintained within very precise tolerances in relation to each other. Since the cutting elements are concentric, the cutting action takes place around the entire circumference of the cutting head. In as much as 360° cutting is not a requirement for cutting grass, the rigidity and tight tolerances required of such a system, as well as the energy requirement to overcome friction between the cutting blades around the entire circumference, are drawbacks in the context of a device devoted to cutting grass.

The prior art fails to provide a vegetation cutting mechanism that combines the efficiency of metal-blade shearing action with an inherent mulching function in a device of relatively low mechanical complexity, light weight, and optimized energy efficiency.

BRIEF SUMMARY OF THE INVENTION

One aspect of the present invention is an apparatus for cutting vegetation. The apparatus includes a reel mechanism and a cutting mechanism. The reel mechanism includes a plurality of reel bars, and the reel mechanism rotates about a first central axis in a first direction. The cutting mechanism includes a plurality of cutting blades. The cutting mechanism rotates about a second central axis in a second direction opposite of the rotation of the first direction. The cutting mechanism is disposed eccentric to the reel mechanism, and vegetation is cut between the reel bars and blades by resilient sliding contact.

Another aspect of the present invention is an apparatus for cutting vegetation. The apparatus includes a reel mechanism and a cutting mechanism. The reel mechanism includes a plurality of reel bars. The reel mechanism rotates about a first central axis in a first direction. The cutting mechanism includes a plurality of cutting blades. The cutting mechanism rotates about a second central axis in a second direction opposite of the rotation of the first direction. The cutting mechanism is positioned eccentric to the reel mechanism wherein the first central axis is offset from the second central axis by a distance less than 10% of the diameter of a reel mechanism. The reel mechanism and the cutting mechanism are configured to have at least one cutting blade of the plurality of cutting blades make resilient sliding contact with at least one reel bar of the plurality of reel bars during the rotation of the cutting mechanism about the second central axis such that vegetation is cut at a section of a rotary path of the reel mechanism that is greater than 10% of a circumference of the rotary path.

Each of the plurality of cutting blades is preferably oriented at an angle ninety degrees or less relative to a tangent of a cylinder defined by the rotational translation through space of the innermost extent of each of the plurality of reel bars, with the angle being measured on the forward-moving side of the cutting blade.

Each of the plurality of cutting blades is straight and each of the plurality of reel bars is helical. Alternatively, each of the plurality of cutting blades is helical and each of the plurality of reel bars is straight.

The number of reel bars is preferably greater than the number of cutting blades. Alternatively, the number of reel bars is less than the number of cutting blades, or the same.

Each of the plurality of cutting blades is preferably composed of a metal material, a plastic material, a composite material, or a number of individual fibers or filaments.

Each of the plurality of reel bars is preferably manufactured to provide a cutting edge at the surface of the cylinder defined by the rotational translation through space of the innermost extent of each of the plurality of reel bars.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1-5, an apparatus of the present invention is generally designated 20. The apparatus 20 includes a reel mechanism 21 and a cutting mechanism 22. The apparatus 20 also preferably includes a frame assembly 23, a transport mechanism 24 and a power source 25. The reel mechanism 21 preferably includes a plurality of reel bars 30 which are preferably sequentially positioned equidistant about a central axis xR. In a preferred embodiment, the number of plurality of reel bars 30 ranges from 3 to 20, more preferably from 5 to 10 and most preferably 7. Each of the plurality of reel bars 30 is preferably composed of a metal alloy such as a steel alloy or titanium alloy. Each of the plurality of reel bars 30 has a first end 30a and a second end 30b. The plurality of reel bars 30 preferably rotates about the central axis xR in a clockwise rotation when viewed from a left end of the apparatus 20 as the observer faces the front of the apparatus.

In a preferred embodiment, the reel mechanism 21 also includes a first end plate 31 and a second end plate 32. Each of the end plates 31 and 32 has a perimeter region 33 and a center region 34. Each of the plurality of reel bars 30 is connected at the first end 30a to the perimeter region 33 of the first end plate 31 and at the second end 30b to the perimeter region 33 of the second end plate 32. Each of the reel bars 30 is preferably helically curved to conform to the surface of a cylinder described by the space contained between the end-plates 31 and 32 at the perimeter region 33. The reel mechanism 21 also preferably includes a power transmission component 35 for delivering rotational movement to the reel mechanism 21. The power transmission component 35 is preferably a gear, a friction wheel, a cog belt pulley or a chain sprocket. However, those skilled in the pertinent art will recognize other devices that may be utilized for the power transmission component 35 without departing from the scope and spirit of the present invention.

The cutting mechanism 22 preferably includes a plurality of cutting blades 40 which are preferably positioned about a central axis xB. In a preferred embodiment, the number of plurality of cutting blades 40 ranges from 1 to 10, more preferably from 2 to 5 and most preferably 2. Each of the plurality of cutting blades 40 is preferably composed of a relatively flexible metal alloy such as spring steel or titanium alloy. Each of the plurality of cutting blades 40 is preferably straight having a first end 40*a* and a second end 40*b*. The plurality of cutting blades 40 preferably rotate about the central axis xB in a counter-clockwise rotation when viewed from a left end of the apparatus 20 by a viewer facing the front of the apparatus.

In a preferred embodiment, the cutting mechanism 22 includes a main axle 100, a plurality of radial arms 43 extending outward from the main axle 100, and a power transmission component 44 for providing rotational movement to the cutting mechanism 22. Each of the plurality of radial arms 43 has a first end 45 and a second end 46. The first end 45 is connected to the main axle 100 and the second end 46 provides a platform for attachment of a cutting blade 40.

In a preferred embodiment, a blade 40 is attached directly to the second end 46 of each of the plurality of radial arms 43. In another preferred embodiment, a blade attachment member 47 is connected to the second end 46 of each of the plurality of radial arms 43, and a cutting blade 40 is connected to the blade attachment member 47. In an even more preferred embodiment, an elastomer member 48 is connected to the blade attachment member 47 and a cutting blade 40 is connected to the elastomer member 48. Further, in a most preferred embodiment, a removable attachment member 49 is attached to the elastomer member 48 and a cutting blade 40 is connected to the removable attachment member 49. Alternatively, the removable attachment member 49 is attached to the second end 46 of each of the plurality of radial arms 43 and a cutting blade 40 is connected to the removable attachment member 49.

Figure 6:
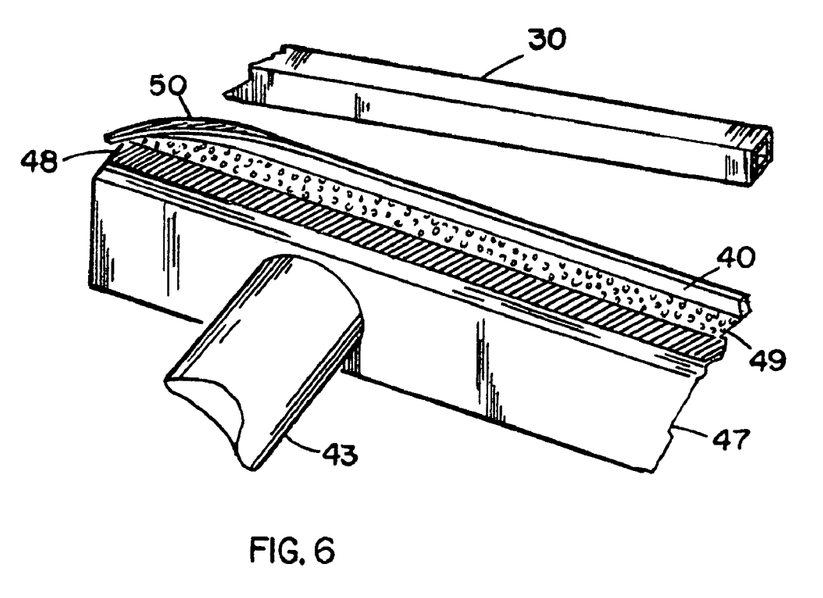
FIG. 6 is an isolated enlarged view of the cutting mechanism engaging a reel bar.

In a preferred embodiment, each of the plurality of cutting blades 40 has a leading edge 50. The leading edge 50 engages an innermost surface 59 of each of the plurality of reel bars 30 to cut the vegetation, as explained in greater detail below.

Figure 7:
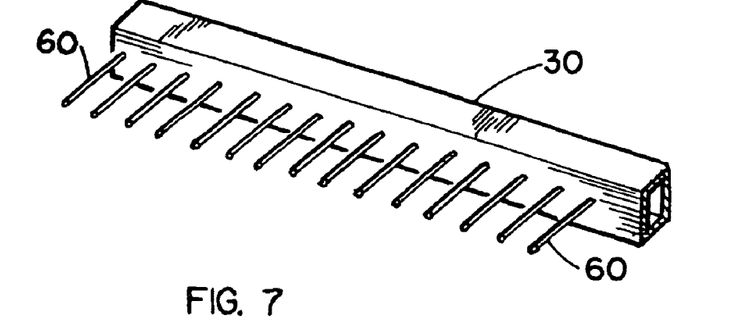
FIG. 7 is an isolated view of a reel bar with tines.

As shown in FIG. 7, in an alternative embodiment, each of the plurality of reel bars 30 has a plurality of tines 60 extending outward to enhance the lifting of vegetation during operation. Each of the tines 60 is preferably an elongated cylindrical rod having a length ranging from 1.0 inches to 3.0 inches.

Figure 1:
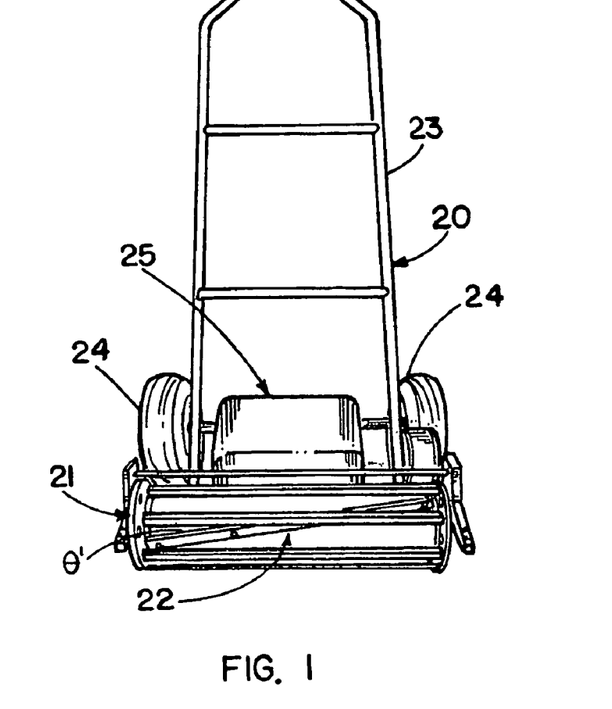
FIG. 1 is a front perspective view of a preferred embodiment of an apparatus of the present invention.
Figure 2:
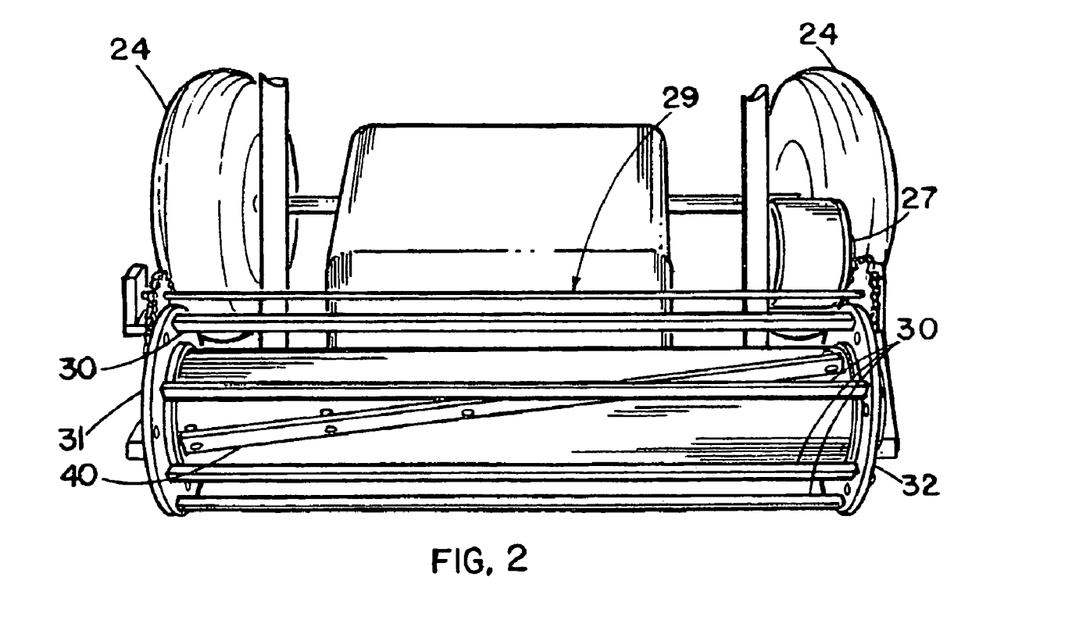
FIG. 2 is an isolated enlarged view of the apparatus of FIG. 1.
Figure 3:
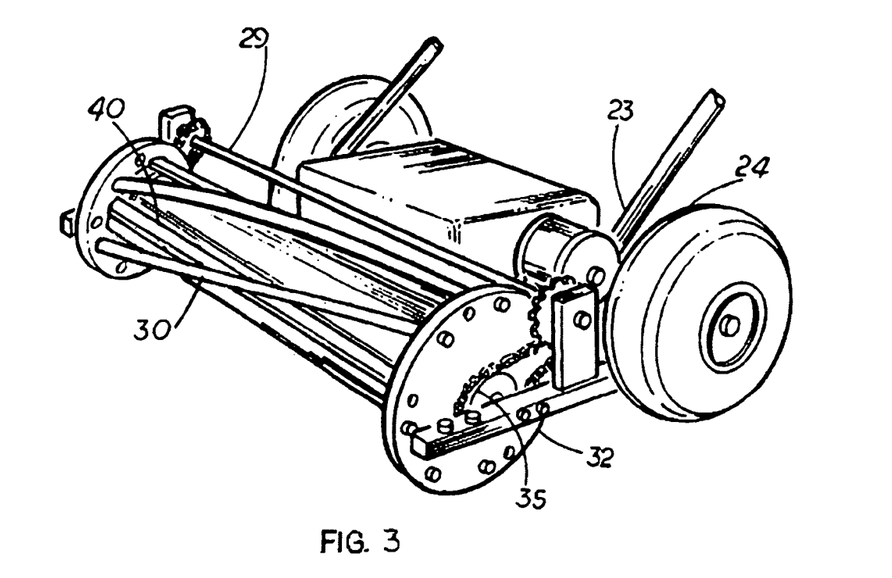
FIG. 3 is an isolated side perspective view of the apparatus of FIG. 1.

The frame assembly 23 preferably provides support for the reel mechanism 21, the cutting mechanism 22, the transport mechanism 24 and the power source 25. In a preferred embodiment, the reel mechanism 21 and the cutting mechanism 22 are positioned forward of the transport mechanism 24 and the power source 25. The power source 25 preferably includes a battery, not shown, a motor 27 and a power transmission component 29. The power source 25 provides the rotational movement for the apparatus 20. This rotational movement is preferably provided by any convenient source, including a ground-contacting friction wheel of the transport mechanism 24, a gasoline or diesel engine, a mains-powered electric motor, a battery-powered electric motor, or other similar motive source.

Figure 4:
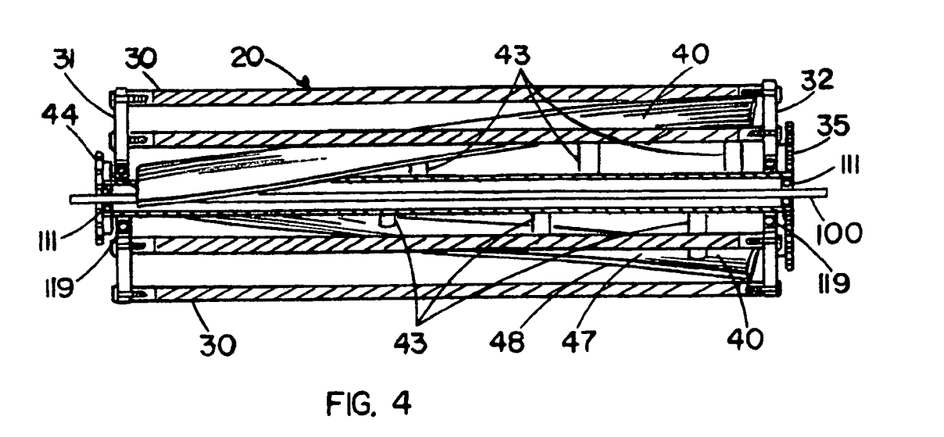
FIG. 4 is an isolated front view of a preferred embodiment of the reel mechanism and cutting mechanism of the apparatus of the present invention.
Figure 5:
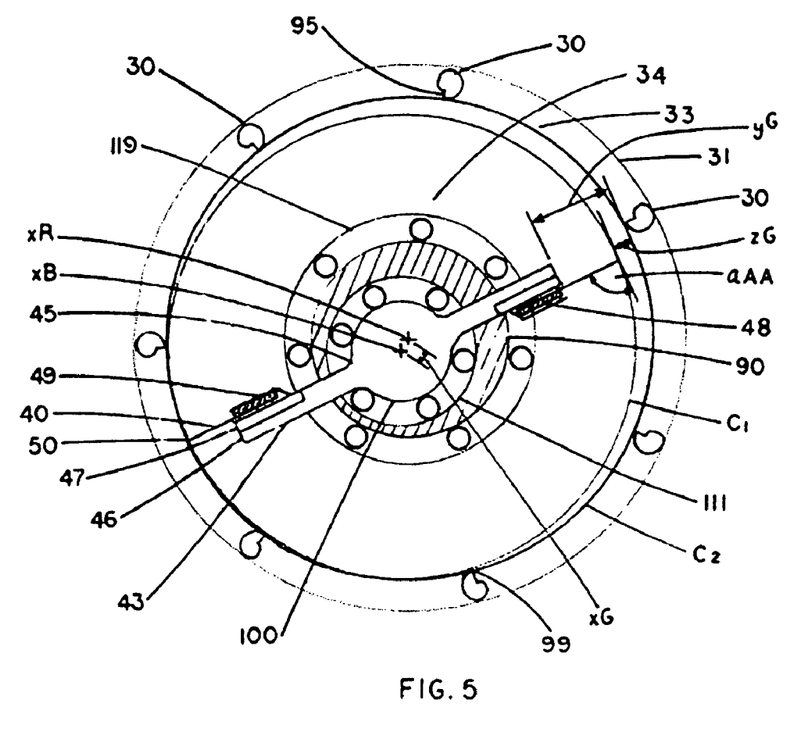
FIG. 5 is a cross-sectional view of FIG. 4.

The frame assembly 23 preferably includes a plurality of bearings 111 which support the ends of the main axle 100 for attachment of the cutting mechanism 22 thereto. Also, the main axle 100 defines a central axis xB relative to which the axis xR of the reel mechanism 21 is offset by a distance xG. The direction of the offset of the reel mechanism 21 is rearward in relation to the front of the mower and upward in relation to the ground. The axle 100 is preferably oriented at an appropriate height parallel to the ground and perpendicular to the direction of motion of the cutting mechanism 22. The power transmission component 44 is preferably affixed to at least one end of the main axle 100 which is preferably designed to extend in the axial direction past bearing 111. Rotational movement is preferably applied to the power transmission component 44 by a matching power transmission component, such as a cog belt, gear, friction wheel or sprocket chain, to rotate the main axle 100 at a relatively high speed counter to the direction of the ground-contacting wheels of the transport mechanism 24.

A plurality of bearings 119 with a relatively large inside diameter are concentrically affixed to the first and second endplates 31 and 32 at the center regions 34. The reel bars 30 are attached to the perimeter regions 33 of the first and second endplates 31 and 32 by conventional attachment means such as bolts. Each bearing support 90 fits within the inside diameter of bearing 119 and is affixed to the frame assemble 23. The diameter of the bearing supports 90 is sufficient to enclose the main axle 100 and the bearings 111 which are offset from the center of rotation of the bearings 119 by the distance xG, and leave sufficient space for the physical attachment of bearing supports 90 to the frame assembly 23 with conventional attachment means such as bolts. The bearings 111 may be housed directly in the bearing supports 90 or in the frame assembly 23, in which case the main axle 100 passes freely through a suitably sized aperture in the bearing supports 90. The power transmission component 35 (such as a cog belt pulley, gear, friction wheel or chain sprocket) is affixed to at least one of the first and second endplates 31 and 32. Rotational energy is applied to the power transmission component 35 by a matching power transmission component such as a cog belt, gear, friction wheel or sprocket chain so that the reel mechanism 21 revolves around the axis of the main axle 100 eccentrically, with the eccentric offset distance xG, in the same direction as the ground-contacting wheels of the external transport means 24.

In a preferred embodiment, the power transmission component 44 is preferably affixed to the main axle 100 and the power transmission component 35 is affixed to the second end plate 32 at opposite ends of the cutting mechanism 22. It is equally possible, however, to place power transmission components 35 and 44 at the same end of the cutting mechanism 22, provided only that the power transmission component 35 attached to the second endplate 32 is of a larger diameter than the power transmission component 44, and that the power transmission component 44 attached to the main axle 100 is offset along the long axis of the cutting mechanism 22 sufficiently to allow the power transmission component 35 to make unimpeded contact with an external source of motive power.

In a like manner, it is also possible to affix a power transmission component 44 to both ends of the main axle 100, and to simultaneously affix a power transmission component 35 to both first and second endplates 31 and 32, provided only that power transmission components 35 attached to the first and second endplates 31 and 32 are of a larger diameter than the power transmission components 44, and that the power transmission components 44 are spaced widely enough apart on axle 100 to allow unimpeded access to an external source of motive power.

Referring specifically to FIG. 5, the length of each radial arm 43 is chosen so that a gap, yG, exists between the second end 46 of each of the plurality of radial arms 43 and the inner surface of each reel bar 30. This gap yG must be sufficient to allow the attachment of cutting blade 40 to the blade attachment surface 47.

In a preferred embodiment, each of the plurality of cutting blades 40 has a leading edge 50. The leading edge 50 engages an innermost surface of each of the plurality of reel bars 30 to cut the vegetation, as explained in greater detail below.

As a result of the eccentric displacement of the axis xR of the reel mechanism 21 relative to the axis xB of the cutting mechanism 22 by the distance xG, the blades edges 50 only make sliding contact with the inner edges 99 of the reel bars 30 in the lower front quadrant of the apparatus 20. That is, the gap zG between the circle C1 described by the rotation of the edges 50 of the cutting mechanism 22 and the circle C2 described by the rotation of the inner edges 99 of the reel bars 30 is approximately 2(xG) at the upper rear quadrant of the apparatus 20, and zero or even slightly negative at the lower front quadrant of the apparatus 20. As a consequence, grass is only cut by the resilient sliding contact between the blade edges 50 and the inner reel bar edges 99 in the lower front quadrant of the apparatus 20. This arrangement thus consumes less energy than if the cutting mechanism 22 and the reel mechanism 21 were concentric and the blades 40 and reel bars 30 made sliding contact around the complete circumference of the apparatus 20.

It will be understood by those practiced in the art that although components of the cutting mechanism 22 are identified individually as main axle 100, radial arms 43, blade attachment surfaces 47, and power transmission component 44, these components may in actuality be manufactured as a single piece using, for instance, an injection molding process. In a like manner, parts of the reel mechanism 21 identified individually as first and second endplates 31 and 32, reel bars 30, and power transmission component 35 may be manufactured in combinations other than as individual parts.

The essential characteristics of the apparatus 20 are (1) the cutting blades 40 rotate inside the reel bars 30 (as opposed to the prior art in which an internal blade is fixed at the cutting height at the bottom of the assembly), and (2) the reel mechanism 21 is mounted eccentrically to the cutting mechanism 22 and makes resilient sliding contact, sequentially, with the inside edge of a reel bar 30 around a section of the rotary path of the movement of the cutting blades 40 and reel bars 30 which is greater than 10% of the complete circumference of the entire rotary path. The section in which cutting is performed preferably ranges from 10% to 30% of the complete circumference.

Figure 10:
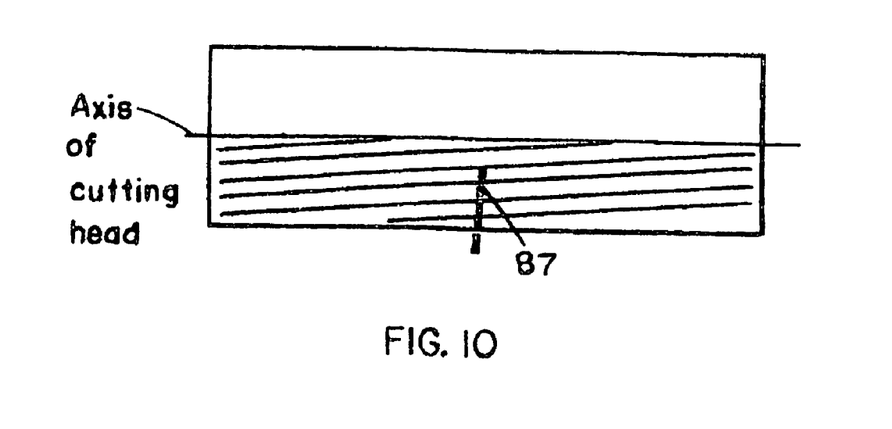
FIG. 10 is a schematic view of a blade of grass within the cutting path of a cutting blade of the present invention.
Figure 11:
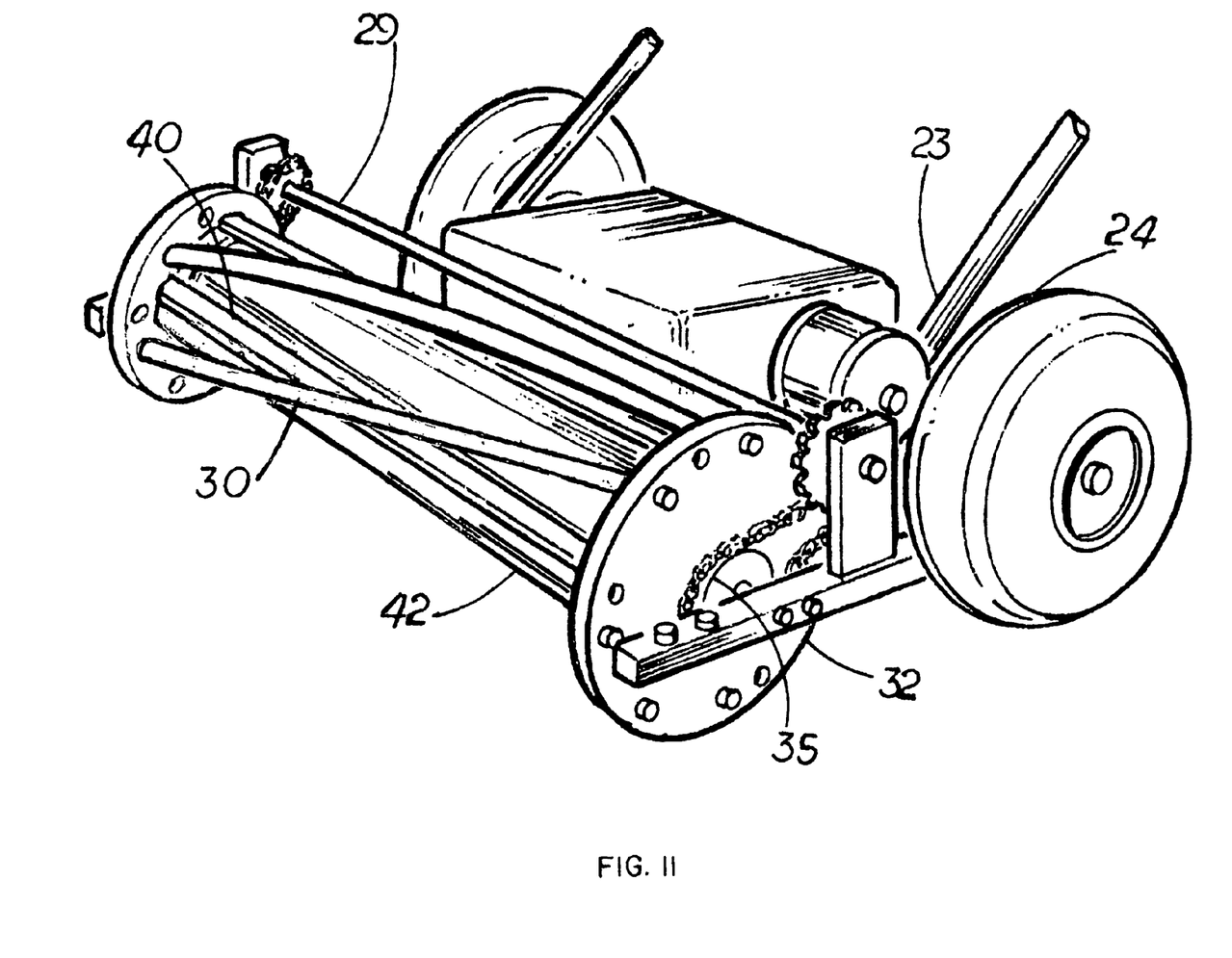
FIG. 11 is an isolated side perspective view of an apparatus of the present invention.

In a preferred embodiment, the present invention employs helical reel bars 30 and straight blades 40, as shown in FIG. 11. FIG. 10 is a schematic diagram of a view of a blade of grass 87 within the cutting path of a cutting blade 40.

The present invention relies on the resiliency/flexibility of at least one of the paired cutting elements (i.e., cutting blades 40 and reel bars 30) to overcome the need to maintain exact tolerances between the cutting elements. The preferred embodiment uses relatively flexible cutting blades 40 that may also be resiliently attached to the elastomer member 48, which is preferably a rubber or plastic foam or a metal spring. In a similar manner, the required "play" or "give" between the cutting surfaces could be provided by mounting the reel bars 30, or at least the cutting surfaces of the reel bars 30, using resilient backing such as an elastomeric material or metal springs. Alternatively, resiliency is designed into both the cutting blades 40 and the reel bars 30.

Figure 8:
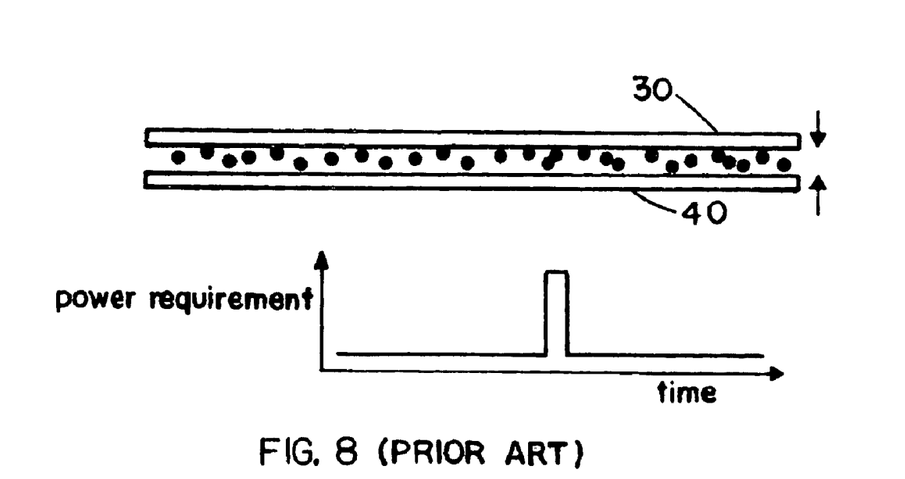
FIG. 8 is a schematic view of a comparative example of a mowing apparatus and an illustration of a power surge during a transit event.

The instantaneous angle of the long axis of a cutting blade 40 relative to the long axis of a reel bar 30 ($\theta^1$ in FIG. 1) is important in that it affects cutting efficiency as well as the power requirements over time. For example, if the blade and reel bar were parallel ($\theta^1$=0, as in FIG. 8), this would maximize the force vector of the shearing action compared to the vector that would tend to push the vegetation sideways. All the vegetation caught between the reel bar and the blade would be cut at the same instant, which would result in a high instantaneous power requirement, and pulsing of the power requirement of the cutting head over time.

Figure 9:
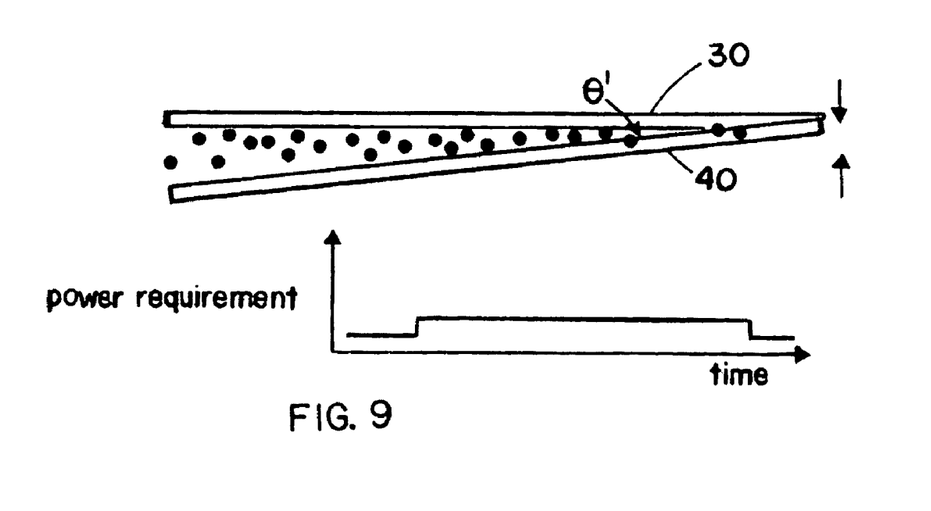
FIG. 9 is a schematic view of a cutting blade engaging a reel bar of the present invention and the power surge during the continuous transit event.

In the present invention, the angle $\theta^1$=>0, as in FIG. 9, and vegetation caught between the reel bar 30 and the cutting blade 40 is cut sequentially. As long as the angle remains relatively small, the shearing force vector stays relatively large compared to the sliding force vector and cutting is relatively efficient. The instantaneous power requirement of the cutting head is reduced, and although slightly more total power is required (due to the increase of the sliding force vector) the power requirement is spread out over a greater time period, reducing power pulsations. In a preferred embodiment the angle $\theta^1$ is between 5 and 10 degrees. As a consequence, there is great latitude in selecting the proportions of the various elements of the cutting head to optimize operation for different applications. Both the number and the length of reel bars 30 are somewhat arbitrary, and depend in practice on the absolute size of the apparatus 20 and the type of vegetation to be cut. The number and length of reel bars 30 are selected to provide an effective shear angle between the reel bar 30 and the cutting blade 40, and to provide a gap of appropriate size to allow the introduction of the vegetation to be cut. As will be appreciated by those practiced in the art, it is also feasible to construct the apparatus 20 with straight reel bars 30 and helical cutting blades 40 in order to achieve the desired shear angle. It is believed, however, that the construction and use of the mechanism is simplified by using helical reel bars 30 and straight cutting blades 40.

The actual cutting path described by the sliding point of contact between blade and bar is a function of their relative angles as well as their relative speed. If the reel bar 30 were to be held fixed in space, the actual cutting path would coincide with the long axis of the reel bar 30. Conversely, if the cutting blade 40 were to be held fixed in space, the actual cutting path would coincide with the long axis of the cutting blade 40. In the case where the reel bars 30 and cutting blades 40 are converging (counter-rotating), the angle of the actual cutting path is some fraction of $\theta^1$.

EXAMPLE

A plurality of reel bars 30 is each preferably constructed of ⅜ inch steel rod. Each reel bar 30 is preferably 22.75 inches in length with a slot 95 machined along the inner length of the rod to create an edge 99 against which a blade 40 can make sliding contact. (All measurements are approximate.) A threaded hole is preferably drilled into each end 30a and 30b of each reel bar 30 to allow attachment of the reel bar 30 to the first and second end plates 31 and 32 by means such as a captive 10-24 set screw. Each of the first and second endplates 31 and 32 is preferably six inches in diameter. The first and second end plates 31 and 32 are preferably composed of cast plastic, but may be composed of other suitable material such as aluminum alloy, and a 3-inch diameter bearing 119 is set into the center of each of the endplates 31 and 32. The bearings 119 ride on bearing supports 90 which in turn are affixed to frame assembly 23. The reel mechanism 21 contains seven reel bars 30.

The two cutting blades 40 are each preferably 22.0 inches in length, 2.0 inches wide, and 0.01 inches thick and preferably composed of spring steel. Each cutting blade 40 is clamped, either at intervals or along some part of its entire length, between the blade attachment surface 47 and the removable attachment member 49 using common clamping means such as bolts or rotating cams with a flat on one side to lock the clamping mechanism in the closed position.

Other examples of the apparatus 20 could be larger or smaller, depending on the intended end use. For instance, the reel bars 30 for a compact apparatus 20 (for a small lawn) are 15 inches in length, although the diameter of the reel mechanism 21 would not likely be reduced much below 6 inches. At the other end of the spectrum, for agricultural and forestry applications, the apparatus 20 has reel bars 30 and cutting blades 40 eight feet in length, and first and second endplates 31 and 32 with a diameter of four feet.

A single 24V DC motor provides motive power for both the reel mechanism 21 and the cutting mechanism 22 through a simple chain drive assembly. The gearing of the chain drive assembly provides for approximately five revolutions of the cutting blades 40 for every one revolution of the reel bars 30. Power is provided by two 12V 9 AH/20 hr. deep discharge batteries connected in series. Power is delivered to the motor via an on-off switch that is controlled by a lever on the handle of the frame assembly 23 of the apparatus 20. The batteries in the example deliver energy that is more than sufficient to cut a moderate growth of grass on a lawn with dimensions of 100×100 feet. The batteries can be recharged using an AC charger about the size of a typical laptop computer power supply in approximately 10 hours. The batteries can also be recharged using a photovoltaic panel.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. An apparatus for cutting vegetation, the apparatus comprising:
    a reel mechanism comprising a plurality of reel bars, the reel mechanism rotating about a first central axis in a first direction;
    a cutting mechanism comprising a plurality of cutting blades, the cutting mechanism rotating about a second central axis in a second direction opposite of the rotation of the first direction, the cutting mechanism positioned eccentric to the reel mechanism;
    wherein the plurality of reel bars and the plurality of cutting blades are configured and arranged to contact each other to cut vegetation therebetween; and
    wherein the contact between the plurality of reel bars and the plurality of cutting blades is resilient sliding contact.

2. The apparatus according to claim 1 wherein the first central axis is offset from the second central axis by a distance less than 10% of the diameter of the reel mechanism.

3. The apparatus according to claim 1 wherein the reel mechanism and the cutting mechanism are configured to have at least one cutting blade of the plurality of cutting blades contact at least one reel bar of the plurality of reel bars during the rotation of the cutting mechanism about the second central axis such that vegetation is cut at a section of a rotary path of the reel mechanism that is greater than 10% of a circumference of the rotary path.

4. The apparatus according to claim 1 wherein each of the plurality of cutting blades is straight and each of the plurality of reel bars is helical.

5. The apparatus according to claim 1 wherein each of the plurality of cutting blades is helical and each of the plurality of reel bars is straight.

6. The apparatus according to claim 1 wherein each of the plurality of cutting blades is oriented at an angle ninety degrees or less relative to a tangent of a cylinder defined by the rotational translation through space of the innermost surface of each of the plurality of reel bars, the angle being measured on the forward-moving side of the cutting blade.

7. The apparatus according to claim 1 wherein the number of reel bars is greater than the number of cutting blades.

8. The apparatus according to claim 1 wherein the number of reel bars is less than the number of cutting blades.

9. The apparatus according to claim 1 wherein the number of reel bars and number of cutting blades is the same.

10. The apparatus according to claim 1 wherein each of the plurality of cutting blades is composed of a metal material.

11. The apparatus according to claim 1 wherein each of the plurality of cutting blades is composed of a plastic material.

12. The apparatus according to claim 1 wherein each of the plurality of cutting blades is composed of a composite material.

13. The apparatus according to claim 1 wherein each of the plurality of cutting blades is composed of a number of individual fibers or filaments.

14. The apparatus according to claim 1 wherein each of the plurality of reel bars is manufactured to provide a cutting edge at the surface of a cylinder defined by the rotational translation through space of the innermost surface of each of the plurality of reel bars.

* * * * *